Oct. 7, 1969 — W. R. GARRETT ET AL — 3,471,177
DUAL DRILL PIPE
Filed Jan. 3, 1967 — 5 Sheets-Sheet 1

William R. Garrett
Stanley C. Moore

ATTORNEY

Oct. 7, 1969   W. R. GARRETT ET AL   3,471,177
DUAL DRILL PIPE

Filed Jan. 3, 1967   5 Sheets-Sheet 2

William R. Garrett
Stanley C. Moore
INVENTORS

BY *Murray Robinson*

ATTORNEY

William R. Garrett
Stanley C. Moore
INVENTORS

ATTORNEY

Oct. 7, 1969  W. R. GARRETT ET AL  3,471,177
DUAL DRILL PIPE

Filed Jan. 3, 1967  5 Sheets-Sheet 5

William R. Garrett
Stanley C. Moore
INVENTORS

BY Murray Robinson

ATTORNEY

United States Patent Office 3,471,177
Patented Oct. 7, 1969

1

3,471,177
DUAL DRILL PIPE
William R. Garrett and Stanley C. Moore, Midland, Tex., assignors to Smith International, Inc., a corporation of California
Filed Jan. 3, 1967, Ser. No. 606,824
Int. Cl. F16l 39/00
U.S. Cl. 285—133     16 Claims

ABSTRACT OF THE DISCLOSURE

Dual drill pipe having multiple fluid passages wherein reverse circulation is used in core drilling and chip drilling without danger of formation breakdown. The outer pipes of the dual pipe are connected together by tool joints screwed or welded to the ends of the outer pipe. The inner pipes are mounted in the outer pipes by releasable spring latches and the ends of the inner pipes are telescoped together. In a modification, the inner pipe is buckled and under compression throughout its length between points of attachment to the outer pipe at each end if one length of dual pipe.

BACKGROUND OF THE INVENTION

Field of invention

This invention relates to dual drill pipe, especially useful in core and chip drilling by the rotary method, wherein reverse circulation must be employed.

Discussion of prior art

Known dual drill pipe is exemplified by that shown in U.S. Patents 2,850,264, Grable, and 3,208,539, Henderson. In commercial practice the inner pipe may be secured at one end to the outer pipe by means of a spider welded to the inner tube and carrying a ring at the ends of the arms of the spider, the ring being externally threaded and screwed into the outer pipe. Since straight threads are used to permit axially precise positioning of the inner pipe relative to the outer pipe, an epoxy glue is applied to the threads to hold the pipes in the desired position. It is difficult if not impossible to unscrew the inner pipe after the glue has set. Therefore it is not practical to attempt repair of the dual pipe by replacement of the worn inner or outer pipe even though only one of the inner or outer pipes is damaged. One object of the invention is to overcome this problem.

In the prior art constructions there is necessarily a gap between the telescoping ends of the inner pipes since there is uncertainty as to the degree of makeup of the outer pipes. Furthermore, when the outer pipe is stretched under tension load of elongates due to temperature rise, the gap between the ends of the pipes increases. In continuous core drilling, the core is apt to hang up on the ends of the inner pipes because of the gap therebetween. It is a further object of the invention to minimize or eliminate this gap.

At the present time there is much single drill pipe which desirably should be converted to dual pipe by insertion of an inner pipe. Due to the variable length of the drill pipe such conversion is rendered difficult, especially in the field, for the inner pipe must be cut off to a precise length in order to match the outer pipe. It is an object of the invention to solve this problem.

It also would be desirable to be able to convert dual drill pipe back to ordinary drill pipe, whenever desired, by removal of the inner pipe. With the present type of nonreleasable mounting of the inner pipe within the outer pipe, this is not possible. A further object of the invention is to provide drill pipe readily convertible from conventonal to dual and back again whenever desired.

SUMMARY OF INVENTION

The foregoing and other object and advantages are achieved by providing a spring latch to connect the inner pipe to the outer pipe. Latches may be provided at each end with the inner pipe made in two sections telescopically joined together or with the inner pipe made in one integral piece and buckled in between the two latches. Alternatively the inner pipe may be latched to the outer pipe at only one end and the juncture of the other end of the inner pipe and the adjacent end of the next inner pipe either made a simple telescopic joint as at present or else a pressure joint. In the case of a pressure joint the inner tube is made long enough so that the inner pipe buckles upon full makeup of the joint between the outer pipes. In case of the constructions employing buckled inner pipes, non-releasable means to hold inner and outer pipes together may be used, but with less advantage than a releasable connection means such as a spring latch. The same is true regarding the construction using an inner pipe composed of two sections telescoped together. In the case of buckled inner pipes, centralizers are preferably omitted except adjacent the ends of the pipes.

In accordance with one embodiment of the invention the inner pipes are held in outer pipes by spring latches that are easily released even after dual pipe has been in service, so that damaged inner or outer pipe can be replaced without throwing away whole dual pipe. Conventional single drill pipe can easily be converted to dual drill pipe by machining latch receiving grooves in tool joints and inserting inner pipe; inner pipe has telescopic joint adapting it to variable length of drill pipe and this also eliminates stress on inner pipes and latches due to tension and compression of outer pipe under load and due to temperature difference between warmer outer and cooler inner pipe.

In a modification, especially adapted for core drilling, problem of cores hanging up on joint between adjacent ends if inner pipe is overcome by using an integral inner pipe assembled in such a way as to be in initial compression whereby on subsequent elongation of the outer pipe due to load or temperature rise the inner pipe would also elongate due to reduction of the compressive load. Stress at the juncture of inner and outer pipe is kept low by leaving the inner pipe free to buckle whereby adequate change of length is accomplished without excessive loading of the inner pipe.

DESCRIPTION OF THE PREFERRED EMBODIMENTS

Referring now to FIGURES 1–8 there is shown a dual pipe including an outer steel pipe 30 and an inner steel pipe 31 disposal within the outer pipe with the length of the inner pipe aligned with that of the outer pipe. The outer pipe is provided with an internally threaded box 32 at its upper end correlative to an externally threaded pin 33 at its other end. The pin 33 has a radial shoulder 34 adapted to engage and seal with the end face of another pipe correlative to end face 35 of box 32. The pin and box provide screw thread means at each end of the outer pipe for making fluid tight connection with the outer pipe of an adjacent similar pipe and to transmit tension, compression, torsion and bending moment therebetween. The pin and box 31, 32 may be formed integrally at the ends of the outer pipe but preferably are formed on tool joints 36, 37 which are screwed into the upsets at the ends of the cylindrical tube forming the remainder of the pipe as shown at 38, 39, or in other manner connected thereto.

Figure 1:
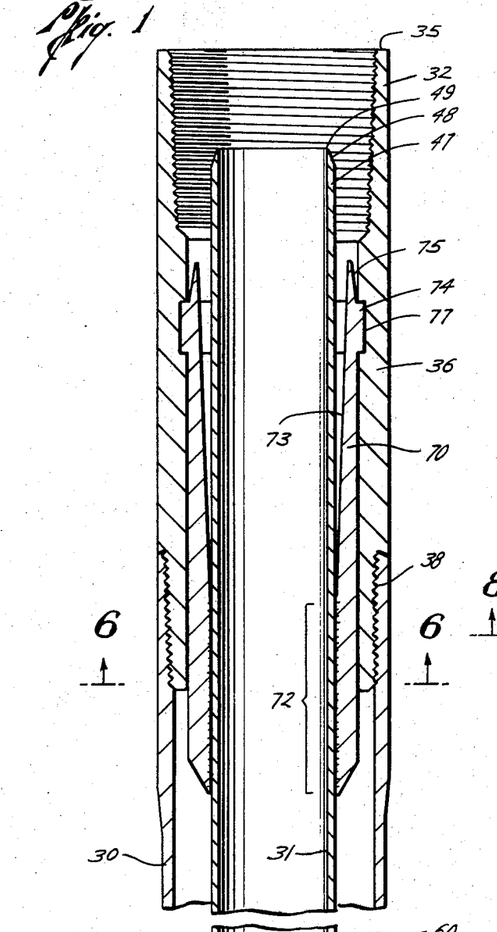
FIGURE 1 is an axial section through the upper end of a dual pipe embodying the invention.
Figure 3:
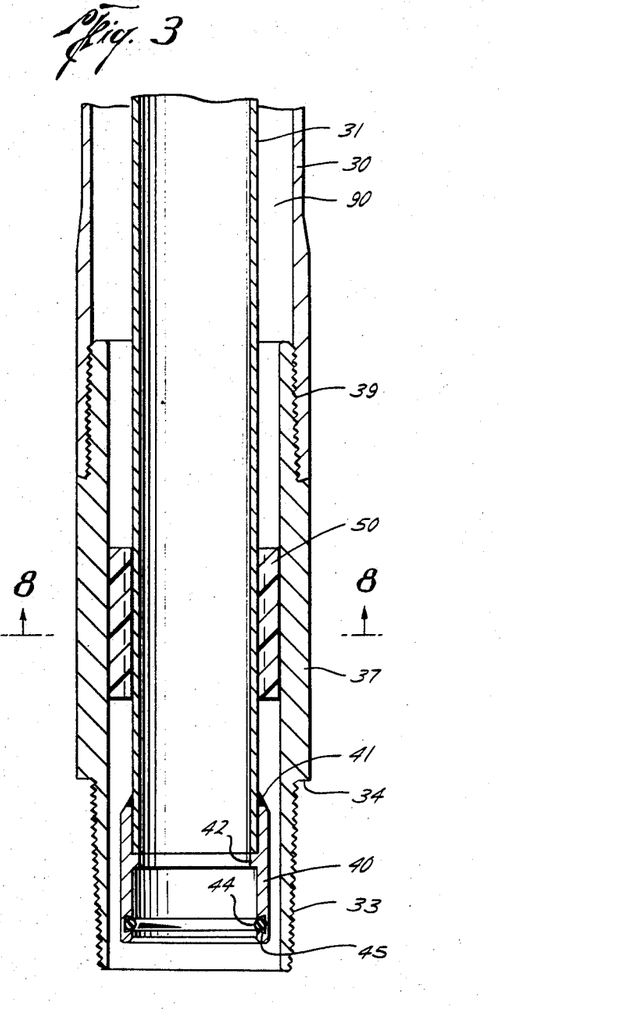
FIGURE 3 is an axial section through the lower end of the pipe shown in FIGURE 2.

The inner pipe is provided with a box 40 in the form of a ring slipped over the lower end of the cylindrical tube forming the remainder of the inner pipe, being welded to the tube at 41. The ring has an internal flange 42 abutting the end of the tube. An O-ring seal 44 is disposed in annular recess 45 on the interior of the ring. The upper end of the inner pipe is finished to form a smooth cylindrical pin 47 adapted to make a telescopic fit inside a box similar to box 40 formed on another length of pipe and to seal with an O-ring therein similar to O-ring 44. The end of pin 47 is provided with a guide taper 48 to facilitate makeup. When two lengths of dual pipe are connected with the pin and box portions of the outer pipes screwed together so that the end of the box engages and seals with the shoulder on the pin, the pin on the one inner pipe lies within the box on the other inner pipe with the end 49 of the pin spaced from the flange 42 of the box whereby relative axial motion of the engaged ends of the inner pipes is possible while maintaining a fluid tight connection. This allows for relative axial motion of inner and outer pipes due, for example, to mechanical stress on the outer pipe or a temperature differential between inner and outer pipes.

Means are provided to centralize the inner pipe relative to the outer pipe. This is necessary at each end in order that the pin and box connections on the ends of the inner pipe will be in register and makeup with those of adjacent pipes when the screw thread connections at the ends of the several pipes are made up. Centralizer means may also be provided intermediate the ends of the dual pipe in order to keep the inner pipe out of contact with the outer pipe, thereby to reduce wear.

Figures 4, 5, 6, 7, 8:
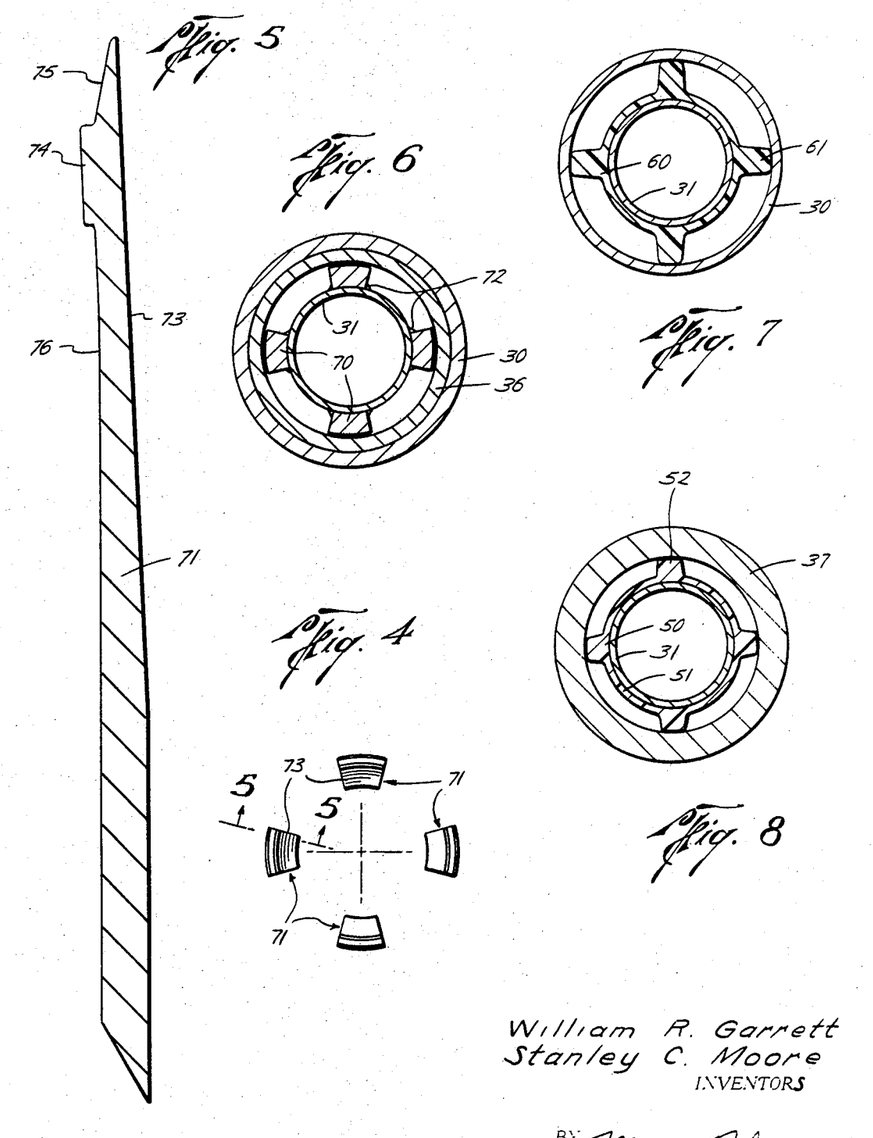
FIGURE 4 is a top view of the spring fingers of the pipe shown in FIGURE 1.
FIGURE 5 is a section taken at plane 5—5 of FIGURE 4.
FIGURE 6 is a section taken at plane 6—6 of FIGURE 1.
FIGURE 7 is a section taken at plane 7—7 of FIGURE 2.
FIGURE 8 is a section taken at plane 8—8 of FIGURE 3.

As shown in FIGURES 3 and 8, centralizer means at the lower end of the dual pipe may take the form of a plastics material spider 50, which may be an elastomer such as rubber. The spider includes a tubular body 51 slipped over the inner pipe secured against axial motion on the inner pipe by an epoxy cement. The spider has a plurality of radial arms 52 which slidably engage the inner periphery of the outer pipe at the tool joint portion 37 thereof.

Figure 2:
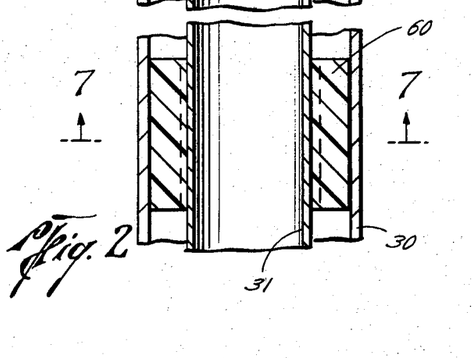
FIGURE 2 is an axial section through an intermediate portion of the pipe shown in FIGURE 1.

Intermediate ends of the dual pipe at one or more locations are disposed centralizer means such as that shown in FIGURES 2 and 7 at 60. This centralizer means is similar to centralizer means 50 except that the radial arms 61 thereof are longer due to the larger inner diameter of the inner pipe at points removed from the tool joint ends thereof.

At the upper end of the dual pipe the centralizer means is combined with holding means to prevent relative axial motion of the inner and outer pipes at that part of the dual pipe, the inner and outer pipes being otherwise free to move axially relative to each other. Such combined centralizer and holding means is shown in FIGURES 1 and 6 at 70 and comprises plurality of spring fingers 71 (see FIGURE 5) annularly disposed as shown in FIGURE 4 and welded to the inner pipe at 72 (see FIGURES 1 and 6) from the lower end of each finger to a mid-portion of the finger. The free (unwelded) upper portion 73 of each finger flares away from the inner pipe as shown at 73, the flare being greater than shown in FIGURE 1 when the inner pipe is not assembled in the outer pipe, such relaxed condition being shown in FIGURE 5. Adjacent the free end of each spring finger is a rectangular, radially projecting detent 74. The end of each finger is provided with cam means in the form of a tapered section 73. The outer surface 76 of the upper part of each finger flares outwardly in the relaxed condition illustrated in FIGURE 5. When the inner pipe is disposed inside the outer pipe as shown in FIGURE 1, the outer surfaces 76 are forced into alignment with the inner surface of the tool joint part 36 of the outer tube at the same time detent 74 snaps into annular recess means 77 formed in the inner surface of the tool joint. The detents and recess means form latch means engageable and releasable by radial out and in motion of the detents when the detents and recess means are in register. The square sides of the detents and recess means provide cooperating shoulder means preventing relative axial motion of the adjacent parts of the inner and outer pipes when the detents are in the recess means.

The latch means is brought into engagement by insertion of the inner pipe into the outer pipe followed by relative axial motion of the inner and outer pipes causing the spring fingers to be forced inwardly as they enter the outer pipe and then the spring bias of the fingers urges the detents into the recess means when the detents register therewith. The latch means is released by forcing a cylindrical tube 80 (see FIGURE 11) axially over the tapered sections 75 to retract the spring fingers until the detents are withdrawn from the annular recess means, whereupon the inner tube can be moved axially to withdraw the inner tube from the outer tube.

The outer surfaces of the spring fingers 71 cooperate with the inner surfaces of the outer tube to centralize the upper end of the inner tube relative to the outer tube. If desired, one can consider that the lowermost parts of the spring fingers form centralizing means and that the middle and upper parts thereof cooperating with annular recess means 77 form latch means to hold the inner and outer pipes against relative axial motion.

It is to be observed that the spaces between the fingers 71 and the spaces between the arms 61 and 52 of the latch means and centralizer means provide fluid passages so that fluid can flow through the annulus 90 between the inner and outer pipes as well as through the inner pipe. The subject pipe therefore serves as multiple fluid passage pipe. Various aspects of the invention will be useful not only in dual pipe but in triple and other multiple fluid passage pipe.

Since the latch means holding the inner pipe against motion relative to the outer pipe is readily engageable and releasable, sometimes described as quick engageable and releasable, requiring only relative axial motion of the inner and outer pipes without relative rotation thereof to bring the latch means into register and automatic engagement, and requires only a simple tool to release the latch means and permit relative axial motion and disengagment of the inner and outer pipes, again without relative rotation thereof, it is apparent that the invention enables ready replacement of either the outer pipe or inner pipe of a damaged dual pipe. At the same time the latch means provides accurate axial positioning of the inner pipe relative to the outer pipe as is needed to insure correct makeup of one length of the dual pipe with another or with other portions of a drill string.

Referring now to FIGURES 9 through 12 there is shown another embodiment of the invention. Since this embodiment is generally similar to that previously described, only the points of difference will be set forth. Like parts will be given the same reference numbers as in the previosuly described embodiment except increased by 100.

Figure 9:
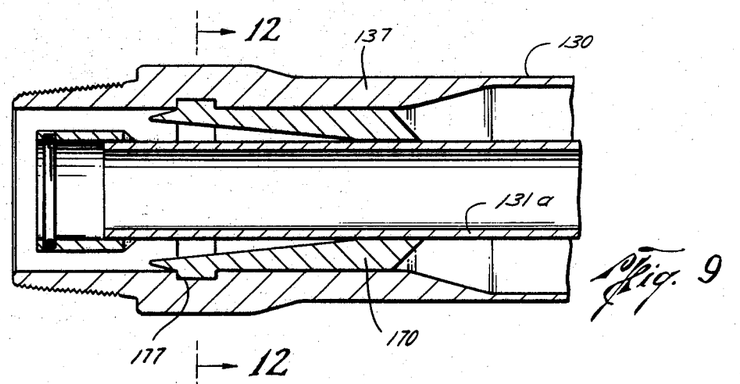
FIGURE 9 is an axial section through the upper end of a dual pipe illustrating a modification of the invention.
Figure 10:
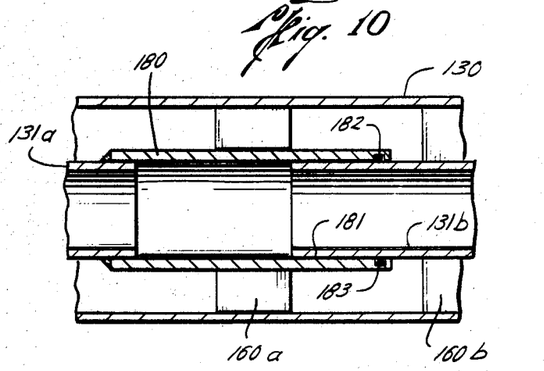
FIGURE 10 is an axial section through an intermediate part of the pipe shown in FIGURE 9.
Figure 11:
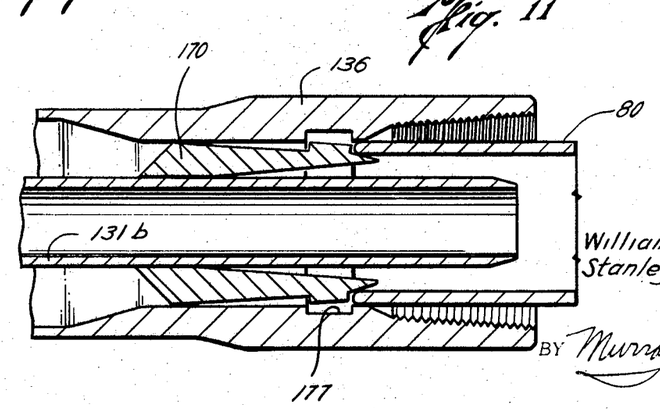
FIGURE 11 is an axial section through the lower end of the pipe shown in FIGURE 9.
Figure 12:
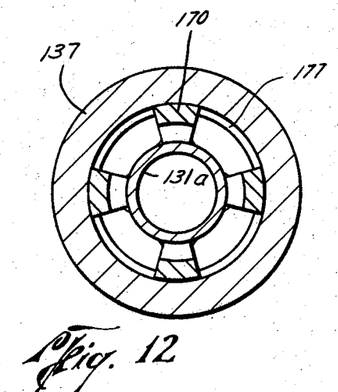
FIGURE 12 is a section taken at plane 12—12 of FIGURE 9.

The outer pipe 130 is provided with tool joints 136, 137 flash welded to the end of the cylindrical tube forming the remainder of the outer pipe. Combined centralizing and holding means 170 are provided at both ends of the dual pipe. The inner pipe is made of two sections 131A and 131B, the end of section 131A having a tube 180 welded thereto forming a box adapted to engage telescopically with the pin formed by the preferably finished end 181 of section 131B. An O-ring 182 disposed in an annular recess 183 in tube 180 provides means to seal between the pin and box. Spiders 160A and 160B similar to spider 60 provide means to centralize the pin and box ends of the two sections of the inner pipe relative to the outer pipe while still providing for fluid passage through the annulus 190. The slip fit telescopic joint provided by box 180 and pin 181 at the free ends of the sections of the inner pipe allow for relative axial motion of the inner and outer pipe due to mechanical stress and temperature differentials even though the inner pipe is held to the outer pipe by the latch means 170 at each end of the dual pipe. Since the section of the inner pipe having the pin end 181 can easily be cut off to any desired length, it is easy to adapt the inner pipe to an outer pipe of any random length such as will be found in actual practice. By machining recess means 177 in the tool joints at the ends of a single drill pipe the latter can readily be converted to a dual drill pipe by insertion of the inner pipe 131A, 131B, and single drill pipe then forming the outer pipe 130. In other respects the construction of FIGURES 9–11 is the same as that of FIGURES 1–8, the outer pipe being provided with screw thread connection means at each end and the inner pipe being provided with slip fit telescopic pin and box connection means at each end and such additional centralizer means being provided between the inner and outer pipes along the length thereof as may be desired.

Figures 13, 14, 15:
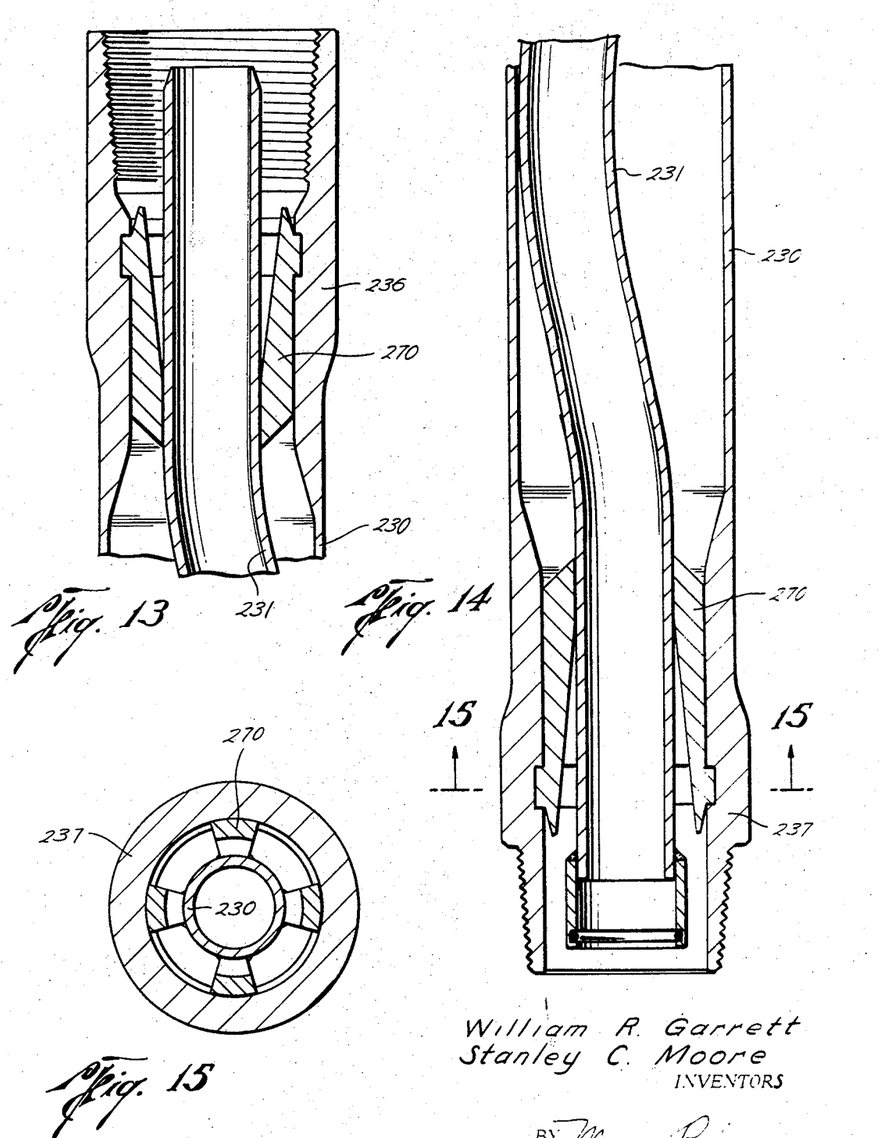
FIGURE 13 is an axial section through the upper end of a dual pipe embodying a further modified form of the invention.
FIGURE 14 is an axial section through the lower end of the dual pipe shown in FIGURE 13.
FIGURE 15 is a section taken at plane 15—15 of FIGURE 14.

Referring now to FIGURES 13–15 there is shown a further modified form of the invention generally similar to that of FIGURES 1–12. Like parts will be identified by the same reference numbers as in FIGURES 1–8 plus 200. The construction of FIGURES 13–15 is the same as that of FIGURES 9–12 except as will now be described.

In this embodiment of the invention the inner pipe 231 is a single section from one end to the other, without any telescopic joint in the middle thereof. The inner pipe is axially compressed between the spring latch type holding means 270 at each end of the pipe to such an extent that it buckles. The inner pipe is restrained against excessive lateral displacement by coming into contact with outer pipe 230. Preferably there are no centralizer means along the length of the dual pipe in between the holding means 270 at each end thereof. Since the inner pipe is initially axially compressed, the outer pipe can elongate under mechanical stress and temperature rise without hinderance by the inner pipe. An advantage over the embodiments of the construction previously described lies in the fact that there is no telescopic joint in the mid-section of the inner pipe and there need be no large gap between the end of the pin and bottom of the box of the telescopic joints between the ends of the inner pipes of adjacent lengths of dual pipe. Therefore there is little likelihood of a core rising in the inner pipe becoming hung up or stuck in the inner pipe by protrusion into the box part of a telescopic joint or connection.

Figure 16:
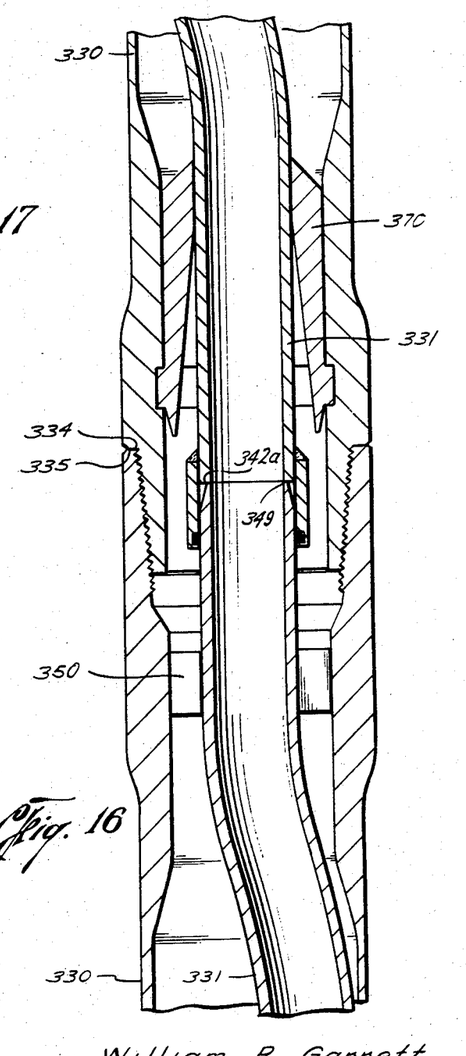
FIGURE 16 is an axial section through the connected ends of two lengths of dual pipe embodying another modified form of the invention.

FIGURE 16 illustrates a fourth embodiment of the invention which is generally the same as that shown in FIGURES 1–9. Like parts bear the same reference numbers plus 300. Only the differences from the embodiment of FIGURES 1–9 will be described.

Figure 17:
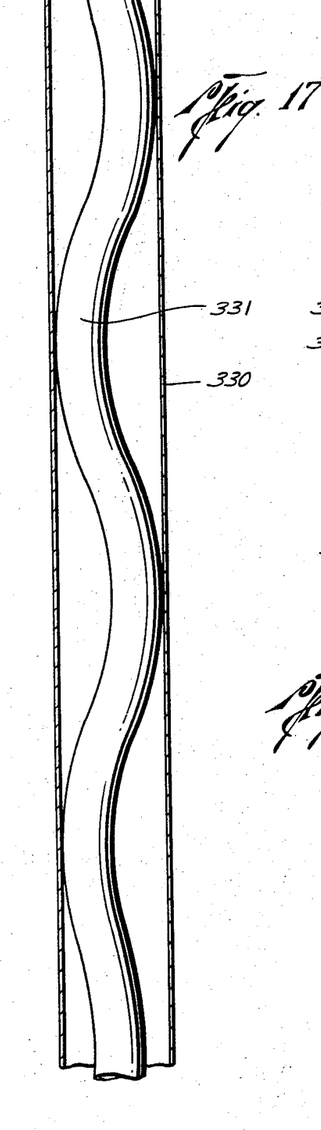
FIGURE 17 is an axial section through an intermediate portion of a dual pipe in accordance with the embodiments of the invention shown in FIGURES 13–15 and FIGURE 16.

In this embodiment the inner pipe 331 is of such a length that when the screw thread connection means on the tool joints flash welded at the ends of the outer pipe 330 are made up tight with like connections on the outer pipes of adjacent lengths of pipe, the upper end 349 of the inner pipe will bear against the shoulder 342A at the lower end of the adjacent inner pipe with sufficient compressive force to buckle the inner pipe, the same as in the last described embodiment, as best shown in FIGURE 17. This comes about because in the unstressed condition the length of the inner pipe between the end or shoulder 349 and shoulder 342A is greater than the length of the outer pipe between shoulders 334 and 335.

Preferably there are no centralizer means along the length of the dual pipe between the latch type holding means 370 at the lower end of the pipe and the centralizer means 330 at the other end of the pipe. As in the FIGURES 1–9 embodiment, there is a holding means 370 to prevent relative axial movement of inner tube and outer tube at only one end of the dual pipe. In this embodiment, as compared to that just described with reference to FIGURES 13–15, even the slight clearance necessary as a manufacturing tolerance between the upper end 349 of the inner pipe and the shoulder 342A at the lower end of the inner pipe is eliminated. In this embodiment the spider serving as centralizer means 330 may be made of steel in view of the radial forces acting thereon when the inner pipe is buckled.

Whether the inner pipe is made in two sections with a telescopic joint therebetween or buckled between two axial holding means in the same or adjacent dual pipes it may be said that slack is provided in the inner pipe to enable the outer pipe to elongate without restraint by the inner pipe.

While preferred embodiments of the invention have been shown and described, modifications thereof can be made by one skilled in the art without departing from the spirit of the invention.

What is claimed is:

1. Multiple fluid passage pipe comprising
an outer pipe and an inner pipe disposed within the outer pipe with the length of the inner pipe aligned with that of the outer pipe,
screw thread means at each end of the outer pipe for making fluid tight connection with the outer pipe of an adjacent similar pipe and to transmit tension, compression, torsion, and bending moment therebetween,
telescopic means at each end of the inner pipe for making fluid tight slip joint connection with the inner pipe of an adjacent similar pipe,
means between each end of the inner pipe and the adjacent end of the outer pipe centralizing the end of the inner pipe relative to the end of the outer pipe, and
retainer means holding at least one end of the inner pipe against axial movement relative to the outer pipe,
said inner pipe and said telescopic means at each end thereof providing an inner fluid passage extending from one end of the multiple fluid passage pipe to the other, said multiple fluid passage pipe having an outer fluid passage extending from said one end thereof to said other end thereof between the exterior of the inner pipe and the interior of the outer pipe past said centralizer and retainer means,
said retainer means including releasable latch means at both ends of the multiple pipe to fix the adjacent end the the inner pipe against axial motion in both directions relative to the outer pipe and engageable by relative axial motion of the inner and outer pipes without relative rotation thereof,
said inner pipe including two sections telescopically engaged at a point between said releasable latch means,
and means between each section of the inner pipe and the outer pipe adjacent said point centralizing the ends of the inner pipe sections relative to the outer pipe.

2. Multiple fluid passage pipe comprising
an outer pipe and an inner pipe disposed within the outer pipe with the length of the inner pipe aligned with that of the outer pipe,
screw thread means at each end of the outer pipe for making fluid tight connection with the outer pipe of an adjacent similar pipe and to transmit tension, compression, torsion, and bending moment therebetween,
telescopic means at each end of the inner pipe for making fluid tight slip joint connection with the inner pipe of an adjacent similar pipe,
means between each end of the inner pipe and the adjacent end of the outer pipe centralizing the end of the inner pipe relative to the end of the outer pipe, and
retainer means holding at least one end of the inner pipe against axial movement relative to the outer pipe,
said inner pipe and said telescopic means at each end thereof providing an inner fluid passage extending from one end of the multiple fluid passage pipe to the other, said multiple fluid passage pipe having an outer fluid passage extending from said one end thereof to said other end thereof between the exterior of the inner pipe and the interior of the outer pipe past said centralizer and retainer means,
said retainer means including releasable latch means to fix the adjacent part of the inner pipe against axial motion in both directions relative to the outer pipe and engageable by relative axial motion of the inner and outer pipes without relative rotation thereof, said screw thread means at each end of the outer pipe comprising a tool joint, said latch means including recess means in said tool joint at said one end of said outer pipe and detent means carried by the inner pipe at one end of said inner pipe of the same multiple pipe as that of which said one end of said outer pipe is a part and spring biased to engage said recess means when in register therewith.

3. A rigid inner pipe adapted to be disposed within a rigid outer pipe with the length of the inner pipe aligned with the length of the outer pipe, said inner pipe having telescopic means at each end thereof for making fluid tight slip joint connection with a length of correlative inner pipe, said inner pipe having centralizing means at each end thereof to disposed the ends of the inner pipe coaxial with the adjacent portions of the outer pipe,
characterized by the fact that at one end at least of said inner pipe the inner pipe is provided with a plurality of spring fingers with an outwardly projecting detent adjacent the free end of each finger adapted to engage a correlative recess in the outer pipe,
each spring finger being an elongated member secured at its other end to the exterior of said inner pipe providing means to centralize the inner pipe relative to the outer pipe, said spring fingers extending longitudinally from their points of securement to the inner pipe toward the adjacent end of the pipe flaring away from said pipe as they approach said adjacent end of the pipe and terminating short of said adjacent end of the pipe and of the telescopic means at said adjacent end of the pipe.

4. An inner pipe adapted to be disposed within an outer pipe with the length of the inner pipe aligned with the length of the outer pipe, said inner pipe having telescopic means at each end thereof for making fluid tight slip joint connection with a length of correlative inner pipe, said inner pipe having centralizing means at each end thereof to dispose the ends of the inner pipe coaxial with the adjacent portions of the outer pipe,
characterized by the fact that at one end at least of said inner pipe the inner pipe is provided with a plurality of spring fingers with an outwardly projecting detent adjacent the free end of each finger adapted to engage a correlative recess in the outer pipe, each spring finger being an elongated member secured at its other end to the exterior of said inner pipe providing means to centralize the inner pipe relative to the outer pipe, said spring fingers extending longitudinally from their points of securement to the inner pipe toward the adjacent end of the pipe flaring away from said pipe as they approach said adjacent end of the pipe and terminating short of said adjacent end of the pipe and of the telescopic means at said adjacent end of the pipe, and cam means at the free end of each spring finger adapted to move the finger radially inwardly upon axial engagement with a tubular tool.

5. Multiple fluid passage pipe comprising
an outer pipe and an inner pipe disposed within the outer pipe with the length of the inner pipe aligned with that of the outer pipe,
screw thread means at each end of the outer pipe for making fluid tight connection with the outer pipe of an adjacent similar pipe and to transmit tension, compression, torsion, and bending moment therebetween,
telescopic means at each end of the inner pipe for making fluid tight slip joint connection with the inner pipe of an adjacent similar pipe,
means between each end of the inner pipe and the adjacent end of the outer pipe centralizing the end of the inner pipe relative to the end of the outer pipe, and
retainer means holding at least one end of the inner pipe against axial movement relative to the outer pipe, said inner pipe and said telescopic means at each end thereof providing an inner fluid passage extending from one end of the fluid multiple fluid passage pipe to the other, said multiple fluid passage pipe having an outer fluid passage extending from said one end thereof to said other end thereof between the exterior of the inner pipe and the interior of the outer pipe past said centralizer and retainer means, said retainer means including latch means at one end of the multiple pipe to fix the adjacent end of the inner pipe against axial motion in both directions relative to the outer pipe and engageable by relative axial motion of the inner and outer pipes without relative rotation thereof, said inner pipe being otherwise free to move axially relative to said outer pipe, said latch means including recess means on one of the outer and inner pipes and detent means on the other of the inner and outer pipes spring biased to engage said recess means when moved axially of the multiple pipe into register with the recess means, said latch means comprising a plurality of elongated spring fingers disposed around the inner pipe, one portion of each finger being secured to one of the inner and outer pipe and all said portions being secured to the same one, the remaining portion of each finger being disposed at an angle with respect to the near surface of the other one of said inner and outer pipes, said spring fingers thereby providing means to centralize the inner pipe relative to the outer pipe.

6. Multiple fluid passage pipe comprising an outer pipe and an inner pipe disposed within the outer pipe with the length of the inner pipe aligned with that of the outer pipe, screw thread means at each end of the outer pipe for making fluid tight connection with the outer pipe of an adjacent similar pipe and to transmit tension, compression, torsion, and bending moment therebetween, telescopic means at each end of the inner pipe for making fluid tight slip joint connection with the inner pipe of an adjacent similar pipe, means between each end of the inner pipe and the adjacent end of the outer pipe centralizing the end of the inner pipe relative to the end of the outer pipe, and retainer means holding at least one end of the inner pipe against axial movement relative to the outer pipe, there being an inner fluid passage through said inner pipe from one end thereof to the other and an outer fluid passage between said inner pipe and said outer pipe from one end of the outer pipe to the other end thereof, said retainer means including holding means at each end of the multiple pipe fixing the adjacent part of the inner pipe against axial motion relative to the outer pipe, and said inner pipe including two sections telescopically engaged at a point between said holding means, said holding means each comprising a recess in the outer pipe and a plurality of elongated spring fingers disposed around the inner pipe, one portion of each finger being secured to the inner pipe and the remaining portion being disposed at an angle with respect to the outer surface of the inner pipe, there being a detent on said remaining portion adjacent the free end of each finger biased by the spring finger into engagement with said recess, said spring fingers thereby providing means both to centralize the inner pipe relative to the outer pipe and lock the inner pipe against axial movement in either direction relative to the outer pipe.

7. Multiple fluid passage pipe comprising an outer pipe and an inner pipe disposed within the outer pipe with the length of the inner pipe aligned with that of the outer pipe, screw thread means at each end of the outer pipe for making fluid tight connection with the outer pipe of an adjacent similar pipe and to transmit tension, compression, torsion, and bending moment therebetween, telescopic means at each end of the inner pipe for making fluid tight slip joint connection with the inner pipe of an adjacent similar pipe, means between each end of the inner pipe and the adjacent end of the outer pipe centralizing the end of the inner pipe relative to the end of the outer pipe, and retainer means holding both ends of the inner pipe against axial movement in either direction relative to the outer pipe, said inner pipe and said telescopic means at each end thereof providing an inner fluid passage extending from one end of the multiple fluid passage pipe to the other, said multiple fluid passage pipe having an outer fluid passage extending from said one end thereof to said other end thereof between the exterior of the inner pipe and the interior of the outer pipe past said centralizer and retainer and screw thread means, said retainer means including latch means at each end of the multiple pipe including recess means on one of the inner and outer pipes and detent means on the other of the inner and outer pipes spring biased to engage said recess means when moved axially of the multiple pipe into register therewith, said inner pipe being buckled and under compression throughout its entire length between said latch means.

8. Multiple fluid passage pipe comprising an outer pipe and an inner pipe disposed within the outer pipe with the length of the inner pipe aligned with that of the outer pipe, screw thread means at each end of the outer pipe for making fluid tight connection with the outer pipe of an adjacent similar pipe and to transmit tension, compression, torsion, and bending moment therebetween, telscopic means at each end of the inner pipe for making fluid tight slip joint connection with the inner pipe of an adjacent similar pipe, means between each end of the inner pipe and the adjacent end of the outer pipe centralizing the end of the inner pipe relative to the end of the outer pipe, and retainer means holding at least one end of the inner pipe against axial movement relative to the outer pipe, said inner piper, and said telescopic means at each end thereof providing an inner fluid passage extending from one end of the multiple fluid passage pipe to the other, said multiple fluid passage pipe having an outer fluid passage extending from said one end thereof to said other end thereof between the exterior of the inner pipe and the interior of the outer pipe past said centralizer and retainer and screw thread means, said retainer means including releasable latch means at one end of the multiple pipe to fix the adjacent end of the inner pipe against axial motion in either direction relative to the outer pipe engagetable by relative axial motion of the inner pipe and outer pipe without relative rotation thereof, said inner pipe being otherwise free to move axially relative to said outer pipe, correlative shoulders at each end of said outer pipe adapted for engagement with like shoulders on the outer pipe of a similar multiple fluid passage pipe when said screw thread means are fully engaged, and correlative shoulders at each end of the inner pipe adapted for engagement with like shoulders on the inner pipe of a similar multiple fluid passage pipe, the distance between said shoulders on the inner pipe exceeding the distance between said shoulders on the outer pipe by an amount sufficient to buckle the inner pipe upon engagement of said outer shoulders with like shoulders on a similar multiple fluid passage pipe.

9. Multiple fluid passage pipe comprising an outer pipe and an inner pipe disposed within the outer pipe with the length of the inner pipe aligned with that of the outer pipe, screw thread means at each end of the outer pipe for making fluid tight connection with the outer pipe of an adjacent similar pipe and to transmit tension, compression, torsion, and bending moment therebetween, telescopic means at each end of the inner pipe for making fluid tight slip joint connection with the inner pipe of an adjacent similar pipe, means between each end of the inner pipe and the adjacent end of the outer pipe centralizing the end of the inner pipe relative to the end of the outer pipe, and retainer means holding at least one end of the inner pipe against axial movement relative to the outer pipe, said inner pipe and said telescopic means at each end thereof providing an inner fluid passage extending from one end of the multiple fluid passage pipe to the other, said multiple fluid passage pipe having an outer fluid passage extending from said one end thereof to said other end thereof between the exterior of the inner pipe and the interior of the outer pipe past said centralizer and retainer and screw thread means, said retainer means including holding means at one end of the multiple pipe to fix the adjacent end of the inner pipe against axial motion in either direction relative to the outer pipe, said inner pipe being otherwise free to move axially relative to said outer pipe, said inner pipe being free to move radially relative to said outer pipe between said centralizer means at each end thereof except as said radial movement is limited by said outer pipe itself, correlative shoulders at each end of said outer pipe adapted for engagement with like shoulders on the outer pipe of a similar multiple fluid passage pipe when said screw thread means are fully engaged, and correlative shoulders at each end of the inner pipe adapted for engagement with like shoulders on the inner pipe of a similar multiple fluid passage pipe, the distance between said shoulders on the inner pipe exceeding the distance between said shoulders on the outer pipe by an amount sufficient to buckle the inner pipe upon engagement of said outer shoulders on a similar multiple fluid passage pipe.

10. Multiple fluid passage pipe comprising an outer pipe and an inner pipe disposed within the outer pipe with the length of the inner pipe aligned with that of the outer pipe, screw thread means at each end of the outer pipe for making fluid tight connection with the outer pipe of an adjacent similar pipe and to transmit tension, compression, torsion, and bending moment therebetween, telescopic means at each end of the inner pipe for making fluid tight slip joint connection with the inner pipe of an adjacent similar pipe, the length of said outer pipe less the length of overlap of the outer pipe with an adjacent similar pipe when the screw thread means thereon are made up fluid tight being equal to the length of said inner pipe less the length of overlap of the inner pipe with an adjacent similar pipe when the elescopic means at the ends thereof are made up fluid tight, means between each end of the inner pipe and the adjacent end of the outer pipe centralizing the end of the inner pipe relative to the end of the outer pipe, and retainer means hold both ends of the inner pipe against axial movement relative to the outer pipe, said inner pipe and said telescopic means at each end thereof providing an inner fluid passage extending from one end of the multiple fluid passage pipe to the other, said multiple fluid passage pipe having an outer fluid passage extending from said one end thereof to said other end thereof between the exterior of the inner pipe and the interior of the outer pipe past said centralizer and retainer and screw thread means, said retainer means including holding means at each end of the multiple pipe fixing the adjacent part of the inner pipe against axial motion in either direction relative to the outer pipe, said inner pipe being buckled and under compression throughout its entire length between said holding means, said inner pipe being radially unsupported relative to said outer pipe except at each end of the multiple pipe and the points of contact between the inner pipe and outer pipe between said holding means resulting from the buckling of the inner pipe, whereby the outer pipe can elongate under mechanical stress and temperature rise without hindrance from the inner pipe.

11. Mutiple fluid passage pipe comprising an outer pipe and an inner pipe disposed within the outer pipe with the length of the inner pipe aligned with that of the outer pipe, screw thread means at each end of the outer pipe for making fluid tight connection with the outer pipe of an adjacent similar pipe and to transmit tension, compression, torsion, and bending moment therebetween, telescopic means at each end of the inner pipe for making fluid tight slip joint connection with the inner pipe of an adjacent similar pipe, there being an inner fluid passage through said inner pipe from one end thereof to the other end thereof and an outer fluid passage between said inner pipe and said outer pipe from one end of the outer pipe to the other end thereof, holding means comprising a recess in the outer pipe and a plurality of elongated spring fingers disposed around the inner pipe, one portion of each finger being secured to the inner pipe and the remaining portion being disposed at an angle with respect to the outer surface of the inner pipe, there being a detent on said remaining portion adjacent the free end of each finger biased by the spring into engagement with said recess, said holding means thereby centralizing the inner pipe relative to the outer pipe and locking the inner pipe against axial movement in either direction relative to the outer pipe.

12. Combination of claim 11 wherein each spring finger includes a cam means at its free end, said cam means lying wholly within said outer pipe located farther from the adjacent end of the outer pipe than said screw thread means.

13. Combination of claim 11 wherein said inner pipe has shoulder means thereon adjacent said telescopic means and said outer pipe has shoulder means thereon adjacent said screw thread means, the length of said outer pipe between said shoulders thereon being less than the length of said inner pipe between said shoulders thereon.

14. Combination of claim 11 including a second holding means between said inner pipe and outer pipe similar to the first said holding means, said holding means being disposed at opposite ends of the multiple pipe.

15. Combination of claim 14 wherein said inner pipe includes two portions telescopically connected at a point disposed between said holding means.

16. Combination of claim 14 wherein said inner pipe is buckled in compression between said holding means.

References Cited

UNITED STATES PATENTS

| | | | |
|---|---|---|---|
| 921,691 | 5/1909 | Friday | 285—319 X |
| 1,854,674 | 4/1932 | Savon | 285—319 X |
| 2,924,245 | 2/1960 | Wilson | 299—6 X |
| 2,930,407 | 3/1960 | Conley et al. | 138—114 |
| 3,065,807 | 11/1962 | Wells | 285—133 X |
| 3,148,894 | 9/1964 | Schwab | 285—319 X |
| 3,195,927 | 7/1965 | Kimbrell | 285—1 |
| 3,208,539 | 9/1965 | Henderson | 285—133 X |
| 3,277,909 | 10/1966 | Militano | 285—319 X |
| 3,286,769 | 11/1966 | Langston et al. | 166—39 |
| 3,302,714 | 2/1967 | Bearden et al. | 166—24 |

FOREIGN PATENTS 228,017    6/1963   Austria.

THOMAS F. CALLAGHAN, Primary Examiner

U.S. Cl. X.R.

138—114; 175—215; 285—319